United States Patent [19]
Greenwood et al.

[11] Patent Number: 5,923,342
[45] Date of Patent: Jul. 13, 1999

[54] VIDEO DISPLAY CONTROLLER

[75] Inventors: Jonathan Mark Greenwood, Basingstoke; Mark John McGrath, Bracknell, both of United Kingdom

[73] Assignees: Sony Corporation, Tokyo, Japan; Sony United Kingdom Limited, Weybridge, United Kingdom

[21] Appl. No.: 08/829,726

[22] Filed: Mar. 31, 1997

[30] Foreign Application Priority Data

Apr. 11, 1996 [GB] United Kingdom .................. 9607518

[51] Int. Cl.⁶ ................................................ G06F 15/16
[52] U.S. Cl. ...................... 345/526; 345/213; 345/502; 345/504; 345/520; 395/200.3; 395/200.38
[58] Field of Search .................................. 345/502, 503, 345/504, 520, 526, 213; 395/200.3, 200.38

[56] References Cited

U.S. PATENT DOCUMENTS

| | | | |
|---|---|---|---|
| 5,027,212 | 6/1991 | Marlton et al. | 345/213 |
| 5,191,648 | 3/1993 | Ikenoue et al. | 395/200 |
| 5,710,895 | 1/1998 | Gerber et al. | 395/327 |
| 5,815,165 | 9/1998 | Blixt | 345/506 |

*Primary Examiner*—Mark R. Powell
*Assistant Examiner*—Vincent E. Kovalick
*Attorney, Agent, or Firm*—Frommer Lawrence & Haug, LLP.; William S. Frommer

[57] ABSTRACT

A laptop computer 53 has an LCD display 542 which is used to display images represented by data-reduced video signals supplied to it from a buffer 52 of a video signal processor (50, 51, 52, 56, 57). The processor is connected to the computer 53 via an SCSI interface having a test adaptor 55, a bus 556 and a device controller 56. The computer is not synchronised with the video. It processes a frame of image data to display the frame, and then requests another frame asynchronously with the video sync. The video signal processor (50, 51, 52, 56, 57) responds to the request by disconnecting from the bus (556) processing the next frame, and reconnecting to the bus to provide the frame synchronously with video frame sync F. Thus the computer becomes effectively synchronised to the video.

11 Claims, 6 Drawing Sheets

VIDEO DISPLAY CONTROLLER

BACKGROUND OF THE INVENTION

1. Field of the Invention

The present invention relates to a video display controller.

2. Description of the Prior Art

It is known in normal television receivers to display in real time images represented by video signals at the same rate (e.g. 25 or 30 frames per second) as they are represented by the video signal.

It is also known to display images after a delay caused by processing of the video signal. Thus may occur where the image data is compressed and decompression takes place before the image is displayed.

Furthermore for some types of display such as an LCD display, the refresh rate of the display may be less than the standard video frame rate.

Also, if a computer is used to display and process a video signal supplied to the computer via an interface circuit, the rate of display may be limited by the interface circuit.

Thus there may occur a problem of synchronising the display of images with the source of the signal representing the images.

SUMMARY OF THE INVENTION

According to one aspect of the present invention, there is provided a video display system comprising a display processor having a display device for displaying images represented by video signals, a source of video synchronisation signals being absent from the display processor, a video signal processor having a source of video synchronisation signals, the processor producing frames of video signals synchronously with the video synchronisation signals, and an interface comprising a first controller in the display processor, a second controller in the video signal processor and a bus linking the controllers, the display processor being arranged to cause the first controller to issue commands to the second controller requesting the supply of frames of video signals to be displayed by the display processor, the video signal processor being arranged to respond to the command by supplying the said frames synchronously with the video synchronisation signals.

According to another aspect of the present invention, there is provided a video display system comprising a display processor having an SCSI host adapter acting as an SCSI master, a video signal processor having a source of video synchronisation signals and an SCSI controller acting as an SCSI slave linked by an SCSI bus to the host adapter, wherein the SCSI slave controls the supply of processed video signals to the SCSI master and thereby synchronises the test adaptor to the video synchronisation signals.

Thus, in both aspects of the invention a display processor is linked to a video signal processor by an interface. The display processor has no source of video synchronisation signals but controls the supply of processed video to it via the interface. To effect synchronisation of the display processor to the video synchronisation signals the video signal processor controls the supply of the processed video to the display. In this way the display processor which is the controlling device is synchronised by the controlled device. In the said another aspect of the invention the SCSI master is synchronised by the SCSI slave.

BRIEF DESCRIPTION OF THE DRAWINGS

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
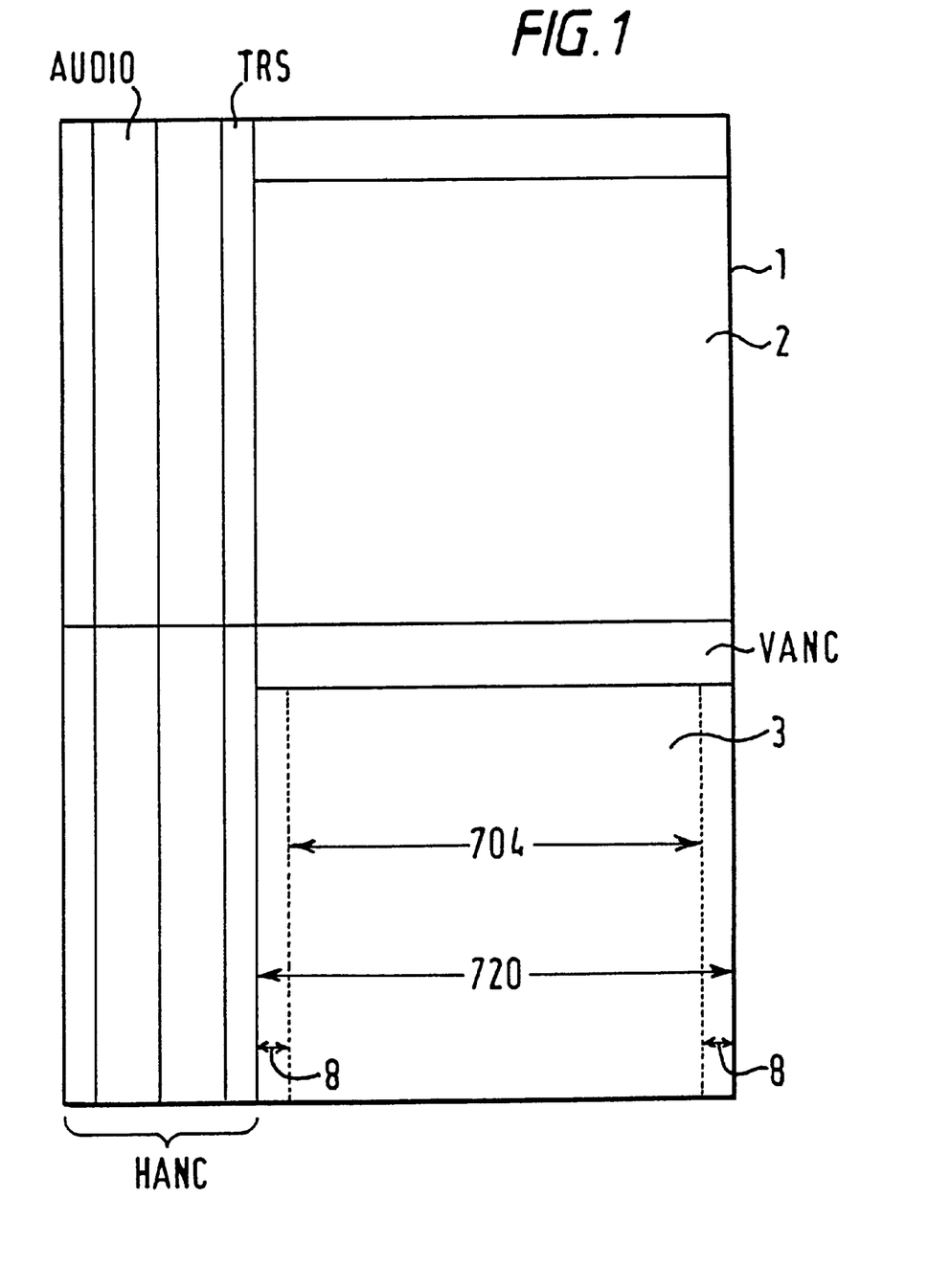
FIG. 1 is a diagram illustrating the format of a frame of SDI video and audio data.

Referring to FIG. 1 there is shown a frame of 4:2:2 component video and audio data conforming to the known SDI standard. The frame 1 comprises two fields 2 and 3. For 525 lines, 60 fields per second video there are 262 lines in field 1 and 263 lines in field 2. For 625 line 50 field per second video there are 312 lines in field 1 and 313 lines in field 2. As shown in the second field 3 of FIG. 1 each field comprises vertical ancillary data VANC in the vertical blanking interval. The active video area comprises 243 lines for a 525 field or 288 lines for a 625 field. Each line in the active area comprises horizontal ancillary data HANC and active video. The HANC includes a timing reference signal TRS. The timing reference signals include signals F, V and H of which F indicates the boundary of a field;

V indicates the active picture area vertically; and

H indicates the active picture area horizontally.

The active line interval for 4:2:2 component video for both 525 and 625 comprises 1440 samples per line, made up of 720 luminance samples and 720 chrominance samples. In the present embodiment of the invention the central 704 samples are used to produce a reduced size image for display. The first and last 8 samples of each line interval are not used to produce the reduced size image.

In the SDI standard there are 27 M samples per second of data, each sample being ten bits. The bits are transmitted serially at a bit rate of 270 M bits per second.

The active video data comprises luminance components Y interleaved alternately with chrominance components Cr, Cb:

Cr Y Cb Y Cr Y Cb Y etc.

In accordance with one aspect of the present invention it is desired to reduce the 720 samples per line and 487 active lines of 525/60 video signal to 176 samples per line and 136 lines per frame for display and to reduce the 720 samples per line and 576 active lines per frame of a 625/50 video signal to the same 176 samples per line and 136 lines per frame for display. In this way both 525/60 and 625/50 signals provide the same aspect ratio of 3.88:3.

Figure 2A:
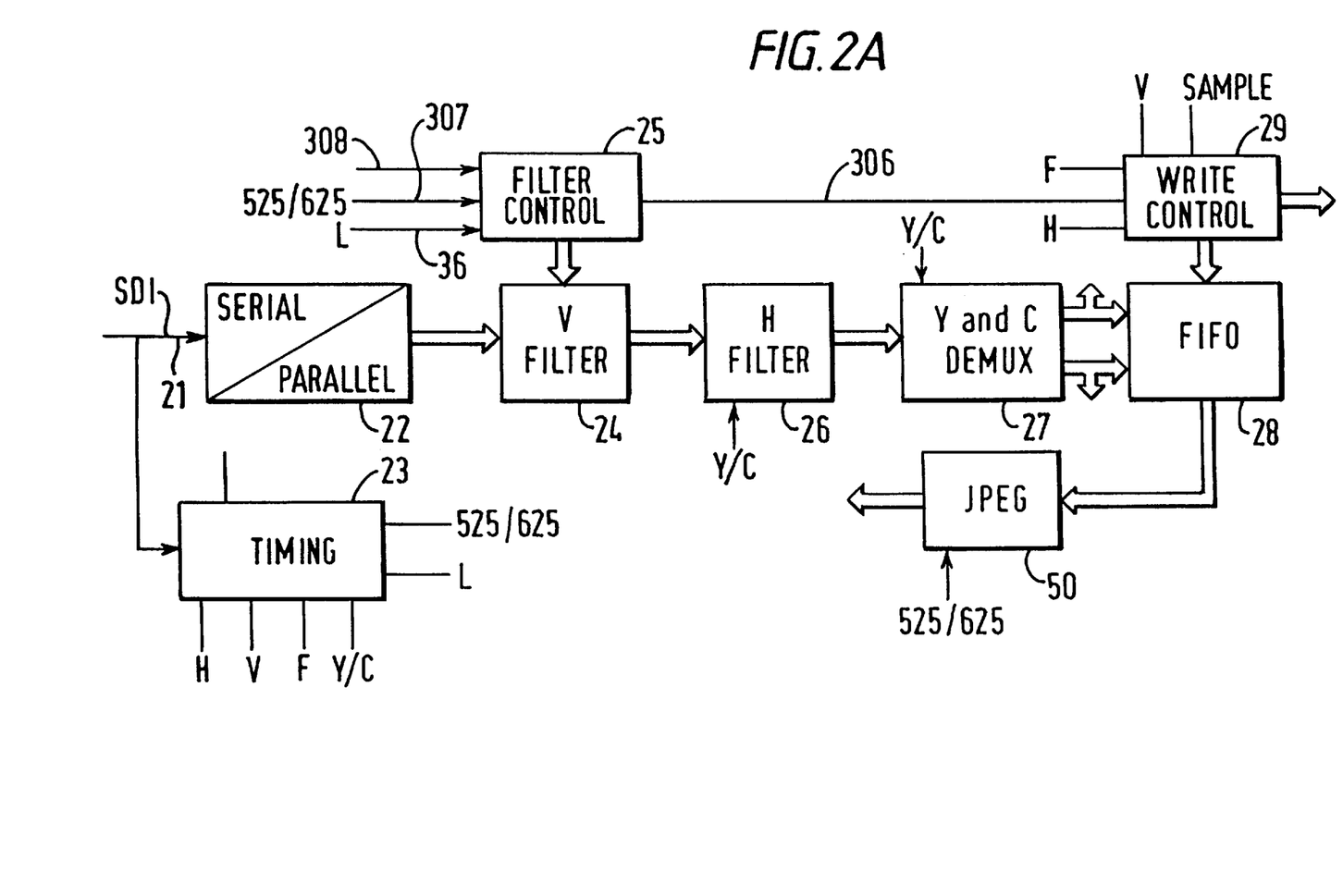
FIG. 2A is a schematic block diagram of a first part of a dual standard video signal processor in accordance with one aspect of the invention.

Referring to FIG. 2 the SDI video data is applied to an input 21 of a serial to parallel converter 22. The SDI data is also applied to a timing control circuit 23 which derives from the HANC the signals H, V and F. The timing control circuit also derives a signal L indicating the start of each active video line and a signal Y/C indicating the timing of the Y and C samples in each line. The Y/C signal is derived from the H signal because the first sample in every line is Cr1. Furthermore, a signal 525/625 is derived by counting the number of lines in each frame. The timing circuit will not be further described because it is within the skill of those expert in this art to derive the signals H, V and F from the SDI data and to derive the Y/C, L and 525/625 signals from the SDI video data.

The serial to parallel converter, which is conventional in the art, converts the ten bit serial data to ten bit parallel data. The serial to parallel converter delivers to a vertical filter 24 all the SDI data on both fields including the HANC and the VANC data.

As will be described in more detail with reference to FIG. 3 the vertical filter 24 together with the filter control circuit 25 vertically filters the lines of data for anti-aliasing purposes prior to decimation, interpolates lines and controls the decimation process.

The vertical filtered data is delivered to a horizontal filter 26. The horizontal filter 26 applies a first anti-aliasing filter characteristic to the luminance components Y and a second anti-aliasing filter characteristic to the chrominance components C.

Figure 2B:
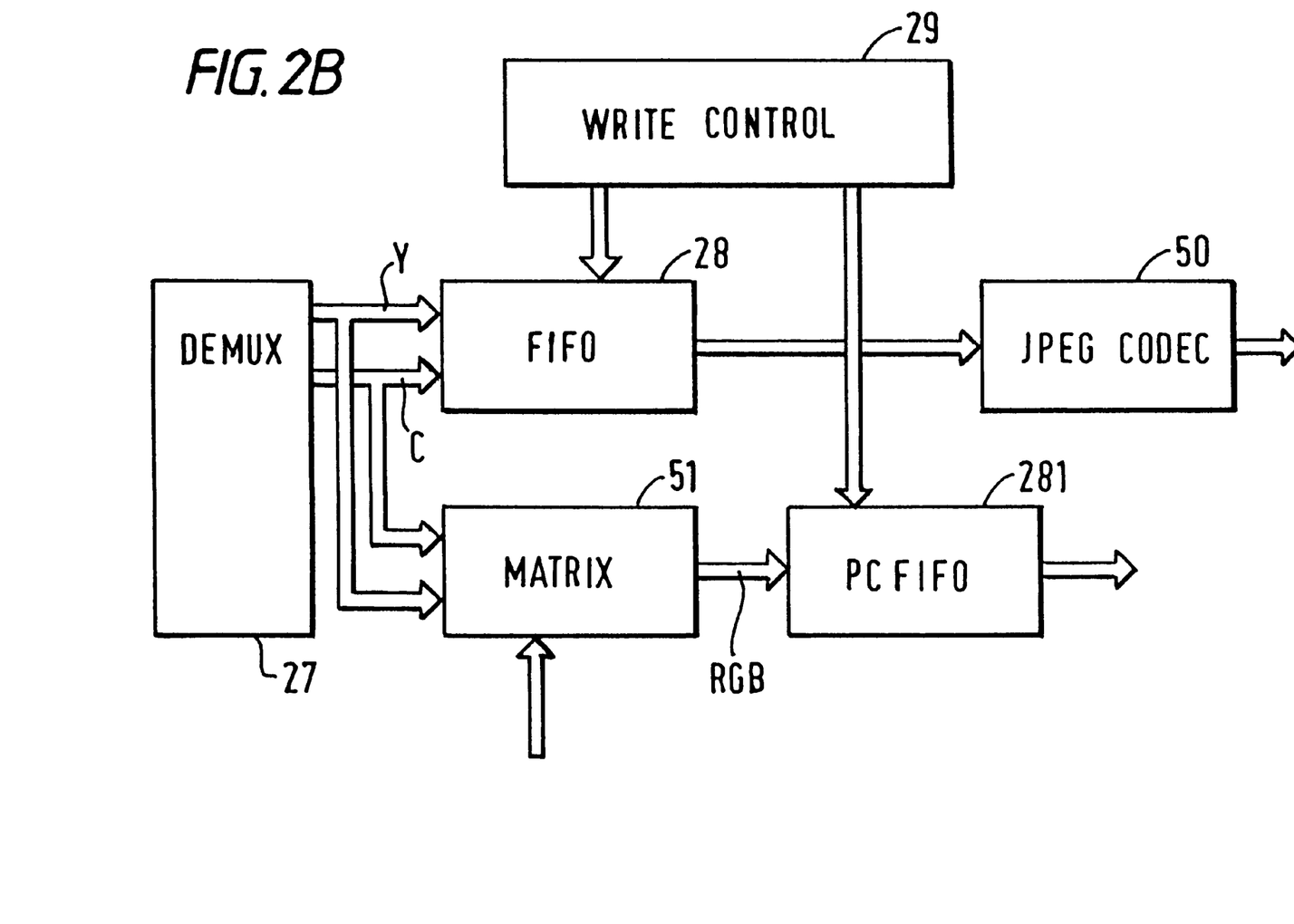
FIG. 2B is a schematic block diagram of a second part of the signal processor of FIG. 2A.

The vertically and horizontally filtered samples are delivered to a demultiplexer 27 which separates the filtered luminance and chrominance components into two separate data streams which are fed to: a first pair of FIFOs 28 (FIG. 2A) one for Y, one for C; and, via a matrix circuit 51, to a second pair of FIFO's 281 (FIG. 2B).

The pairs of FIFOs 28 and 281 act as the decimator under the control of a write control circuit 29.

The data supplied to the inputs of the pairs of FIFOs 28 and 281 comprises two whole fields of vertically and horizontally filtered data per frame interval including HANC and VANC data. The write control circuit 29 responds to the timing signal F representing fields to disable writing of data into the FIFOs for odd fields. Thus only even fields of data are written into the FIFOs 28 and 281.

The data at the input to the FIFOs 28 and 281 includes the VANC and HANC data. The write control circuit 29 responds to the timing control signal H representing active video horizontally and the timing signal V representing active video vertically to enable writing of only active video data into the FIFOs 28 and 281 excluding the HANC and VANC intervals. Thus only active video data is written into the FIFOs 28 and 281.

Only 704 samples of the 720 samples per line are used to derive the reduced size image. The write control circuit 29 responds to a line selection signal 306 indicating each line to be written and to the timing signal Y/C indicating the timing of samples on each line to:

1) disable writing of data into the FIFOs for the first and last eight luminance and chrominance samples of each line; and 2) write into the FIFOs only one out of every four of the remaining 704 active samples.

In this way all samples of each line interval are supplied to the FIFO but only 176 samples per line of each even numbered field are stored in the FIFOs. Also because the first and last eight luminance samples and the first and last eight chrominance samples of each active line are excluded, any effects from horizontally filtering the HANC on the active video are eliminated.

For 625/50 video there are 288 active lines per field. Only 136 lines are required, equivalent to a decimation factor of 2.12 as will be explained with reference to FIG. 3.

For a 525/60 image there are 243 active lines per field whereas only 136 lines are required in the reduced size image corresponding to a decimation factor of 1.79 as will be explained with reference to FIG. 3. The vertical decimation is provided by the write control circuit 29 which responds to a line selection signal provided by an output 306 of the filter control circuit 25 which selects interpolated lines for storage in the FIFOs 28 and 281 and thus for display in the reduced size image.

The video data comprising Y, Cb, Cr samples representing the reduced sized image is read out of the FIFOs 28 to a JPEG codec 50. Although the reduced size image data provided to the JPEG and derived from both 525 and 625 line images has the same number of lines per frame and the same number of samples per line, the data derived from the 525/60 signal has a field rate of 60 fields per second whereas the data derived from a 625/50 signal has 50 frames per second. Thus the data rate of the reduced size image derived from a 525/60 signal is greater than that derived from a 625/50 signal.

The data compressed signals in a presently preferred embodiment of the invention are stored in, for example, a disc storage device such as a magneto-optical disc. So that equal times of data compressed and decimated 625/50 and 525/60 signals may be stored the 525/60 signals are compressed by a factor 6/5 greater than the 625/50 signals.

Referring to FIG. 2B, on replay, the compressed data is decompressed in the JPEG codec 50, and then supplied to a matrix circuit 51 and converted to RGB signals and supplied to FIFO 281. Decimation is, obviously, disabled on replay. The data is read out synchronously with frame sync.

The Y, Cb, Cr samples are also fed directly from the demultiplexer 27 to the matrix circuit 51 where they are converted to RGB signals and decimated in the FIFOs 281 for direct display. The manner in which the signals are displayed, in accordance with another aspect of the invention, will be described with reference to FIG. 5.

For a 625/50 signal it is desired to derive 136 lines of a reduced size image from 288 lines of the even numbered field of the original 625/50 signal. Thus it is desired to derive less than one line of the reduced size image for every 2 lines of a field of the 625/50 signal. The first line of the 136 lines of the reduced size image is identical to the first line of the 288. Thus (136−1) lines are derived from (288−1) giving a decimation factor of 2.12. If a line of the reduced image is interpolated from every 2 lines of the 287, then 143 lines are produced. By deleting every 18th of the 143 interpolated line, 8 interpolated lines are deleted giving 143−8=135 lines.

For a 525/60 signal 136 lines of the reduced image are derived from 263 lines. Again the first line of the 136 is identical to the first line of the 263. Thus (136−1) lines are derived from (243−1) giving a decimation ratio of 1.79. Interpolating one line for each pair of the 243 gives 131 lines. Thus 4 additional interpolated lines must be provided. Thus one extra line must be interpolated for every 33 of the 131 interpolated lines.

Figure 3:
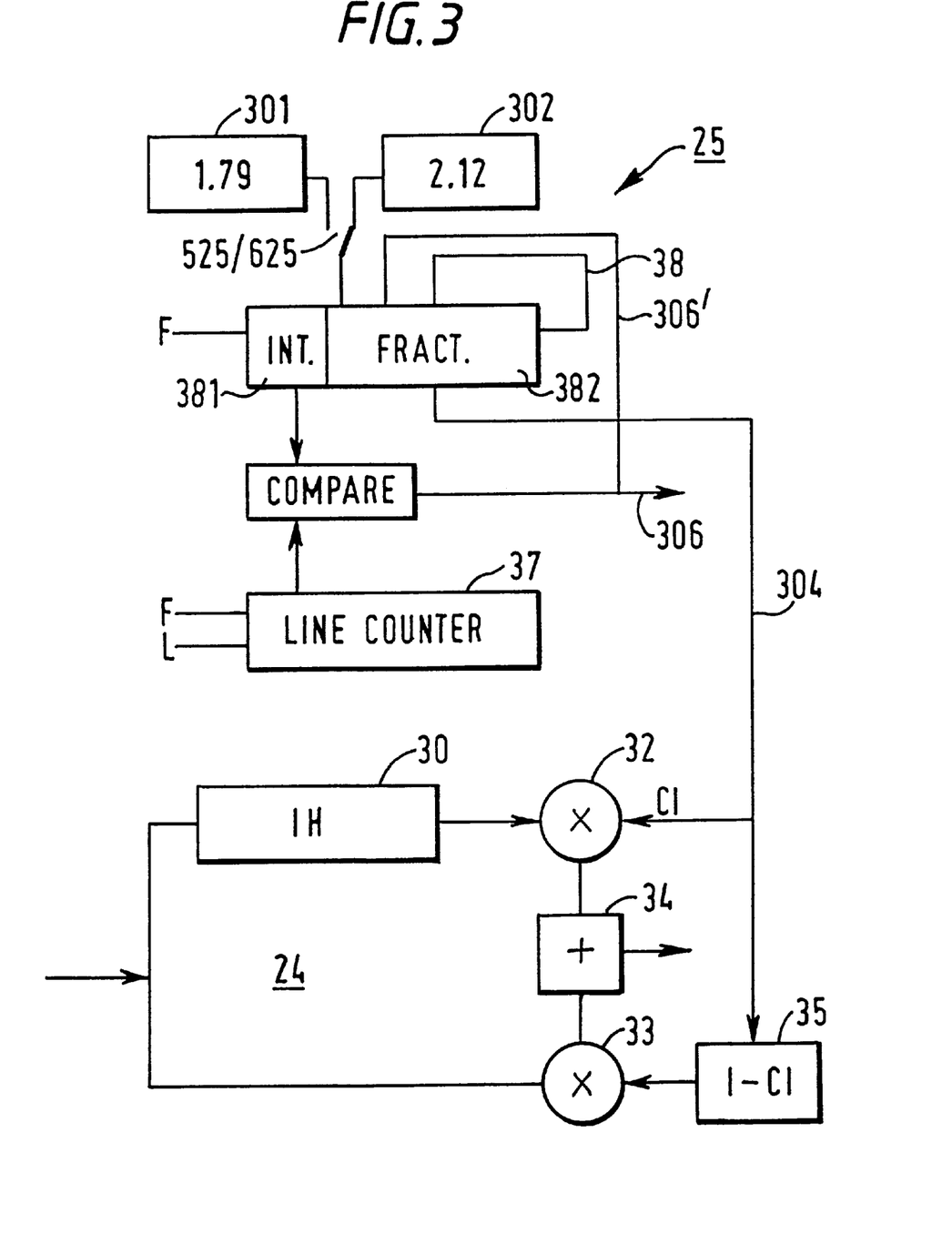
FIG. 3 is a schematic block diagram of a vertical filter and filter control circuit of the video signal processor of FIG. 2.

Referring to FIG. 3, the vertical filter 24 comprises a delay line 30 providing a delay of 1 line interval (IH), multipliers 32 and 33 and an adder 34. Samples delayed by the IH delay line 30 are fed to multiplier 32 and undelayed samples are fed to multiplier 33 via a connection 31.

The samples are weighted in the multipliers 32 and 33 by coefficients C1 and C2=(1−C1) and added in adder 34. The circuit outputs an interpolated line for every input line. For example it produces 288 interpolated active lines per field for a 625/50 input signal.

The coefficients C1 and C2 are derived from the filter control circuit 25 shown in FIG. 3.

The circuit 25 comprises a line counter 37 which is kept reset until the first active line of field 2 appears when it counts line pulses provided by the line timing signal L. An accumulator 38 comprises an integer part 381 (e.g. 9 bits) and a fractional part 382 (e.g. 12 bits).

The accumulator 38 is kept reset until the first active line of field 2 appears. The accumulator 38 is, for example maintained in a reset state contains all '1's, so that all the lines of the first field are interpolated by the same coefficients (C1) and (1-C1). The accumulator is then reset to zero at the first active line of field 2. Each time the accumulator is enabled via connection 306' it adds to its contents a preset number stored in a store 301 for 525/60 signals or a number stored in a store 302 for 625/50 signals. The numbers stored are the respective decimation factors 1.79 for 525/60 and 2.12 for 625/50.

The integer part of number in the accumulator 381, 38 is compared in a comparator 305 with the count in the line counter 37. If the integer numbers are unequal, a line deselect signal is output on connection 306. If the numbers are equal a line select signal is output on connection 306. The line select signal also enables the accumulator to add the preset number to its contents.

The fractional part of the number in the accumulator 382, 38 is the coefficient C1. C2 is derived from C1 by subtracting C1 from 1 in a circuit 35 which may be a subtracter. For the first line of a field C1=0, C2=1 and so the first line output by circuit 24 equals the first input line.

Figure 4A:
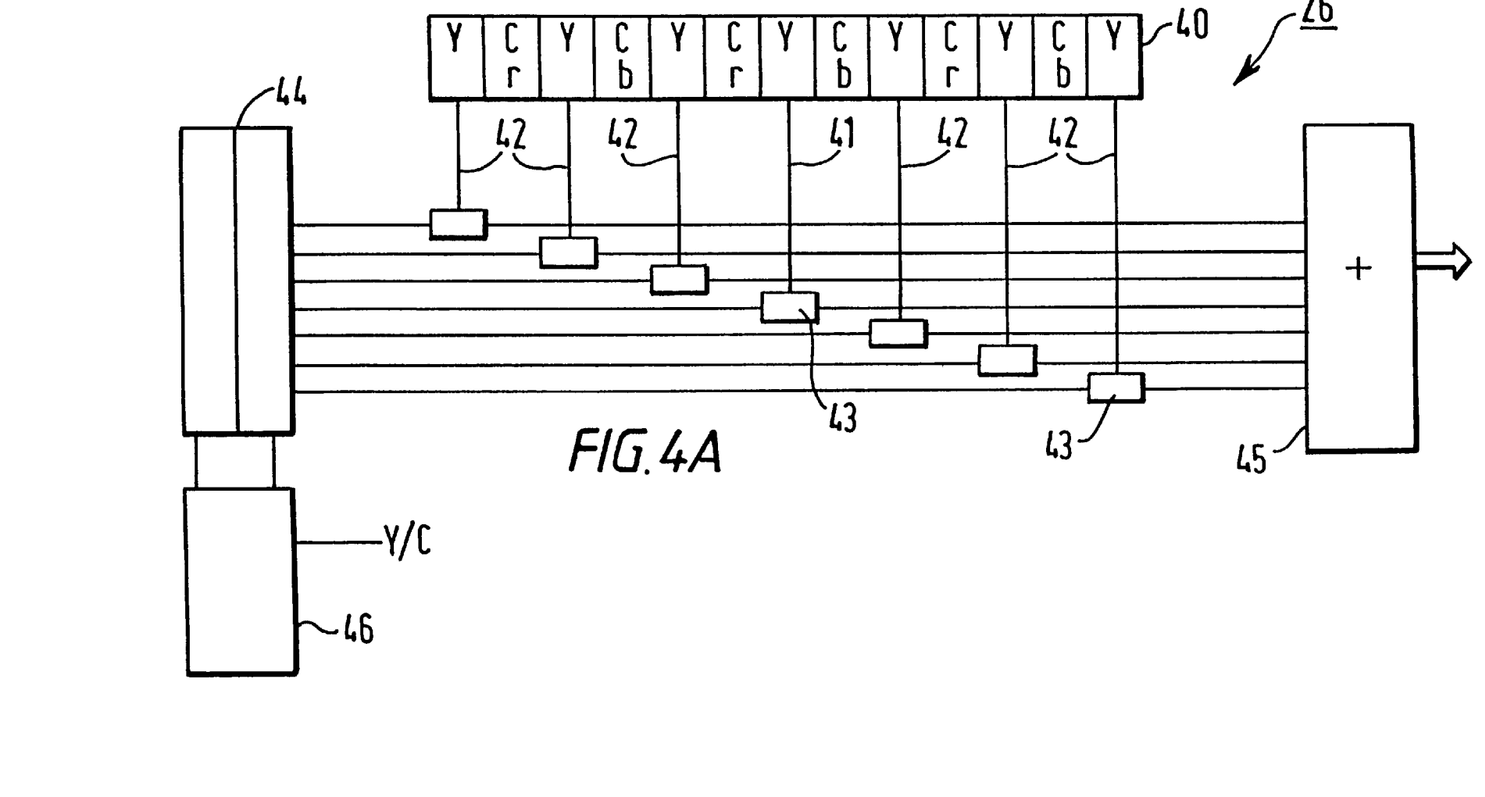
FIGS. 4A and 4B are schematic diagrams of a horizontal filter of the processor of FIG. 2.
Figure 4B:
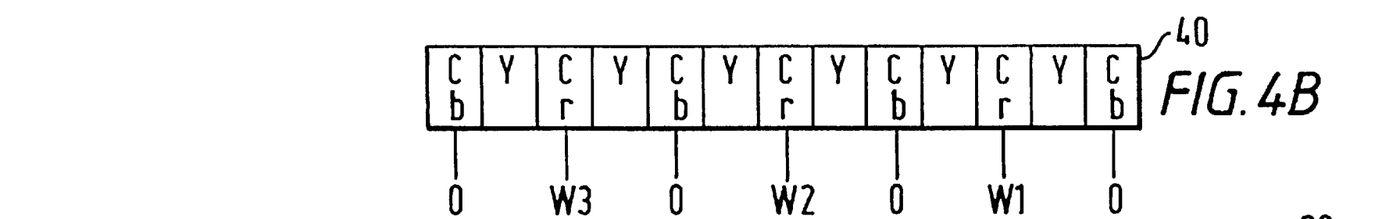

The horizontal filter 26 is a symmetrical FIR filter and is shown in FIGS. 4A and 4B. It comprises a tapped delay line 40. For convenience the line is shown as having 7 taps 41 and 42 of which 41 is the centre tap with taps 42 arranged symmetrically with respect to tap 41. The number of taps used is a matter of design choice within the skill of the expert in the art. The taps are connected to alternate stages of the delay line. The taps are connected to weighting circuits 43 which receive respective coefficients from a store 44. The weighted samples are summed in an adder 45.

The 4:2:2 component video comprises Y, Cr and Cb samples interleaved as shown in FIGS. 4A. The Y samples are shown present at tap central 41 and at the symmetric taps 42. For each group of 7Y samples centred around tap 41 a filtered Y sample is produced at the output of the adder. The 7 coefficients for filtering the Y samples are selected from the store 44 by a selector circuit under the control of the Y/C timing signal.

The Cr and Cb samples are weighted in groups of for example 3. Thus when a Cr and Cb sample is present at tap 41, all but 3 of the coefficients are set to zero as shown in FIG. 4B. The store 44 stores such a set of coefficients which are selected by the Y/C timing signal.

It will be recalled that all the data including the HANC is horizontally filtered. The unused 8 samples at each end of each active line prevent contamination by the HANC of the filtered video samples used to produce the reduced size image.

The demultiplexer and the matrix circuit are conventional circuits and require no further description.

Figure 5:
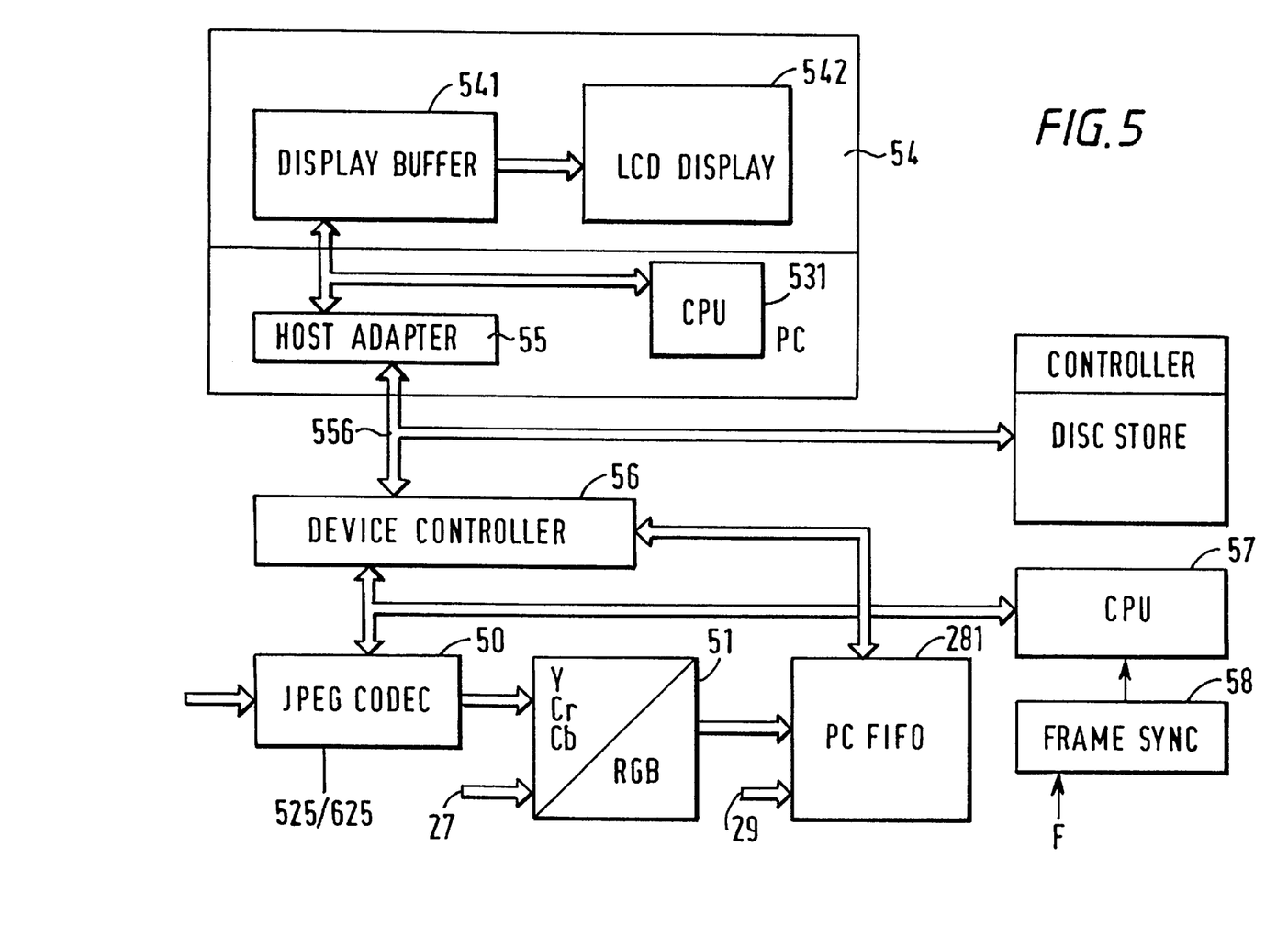
FIG. 5 is a schematic block diagram of a video display in accordance with another aspect of the invention.

Referring to FIG. 5, the reduced size images are displayed, in this illustrative embodiment of the invention, on an LCD display 542 of a computer, which in this example is an IBM Thinkpad (Trademark) laptop computer 53. The computer 53 comprises a CPU 531 and a bus 532 to which are connected a display driver 54 including a display buffer 541 and the LCD display 542.

The video signal processor of FIG. 2 comprises the JPEG codec 50, the matrix 51 and an image buffer store 281. The matrix 51 receives reduced size image data either directly from the demultiplexer 27 of FIG. 2 or from the codec 50.

The codec 50 and the buffer 281 are coupled to a bus 571 and are controlled by a CPU 57 via the bus.

A source 58 of frame synchronisation (sync) signals is provided in the video signal processor. The source 58 provides the sync signals in response to an external synchronisation signal, (the SDI) or is free-running if SDI is not connected. The source 58 is connected to the CPU 57 to cause the buffer 281 to output the frames of the reduced size image synchronously with the frame sync signal.

The computer 53 has no source of frame sync signals.

The computer 53 is connected to the video signal processor by a SCSI-2 interface comprising a host adapter 53 connected to the bus 532 in the computer, a SCSI bus 556 and a device controller 56 connected to a bus 571 in the video signal processor.

The computer 53, in this example, displays alternate frames of the reduced size image because it is not sufficiently fast to display every frame. A faster computer would be able to display every frame. The computer 53 acting as a SCSI initiator issues to the video signal processor a command requesting the supply of a frame of reduced size image whenever it is ready to process and display the frame.

The command, which in this example is a vendor-specific SCSI command, is implemented by the video signal processor which acts as a SCSI target, and provides the frame synchronously with the frame sync signal. Thus the target controls the synchronisation of the initiator.

The SCSI-2 standard is defined in ANSI X3.131-1994 and is also described in books such as "*The SCSI Bus and IDE Inteface*" by Friedholm Schmidt, published by Addison-Wesley ISBN 0-201-42284-0. Thus the details of the operation of the SCSI interface do not need to be described here.

The vendor specific command issued by the host adapter is implemented in the target.

In accordance with the SCSI-2 standard the command has the format

| Bit/Byte | 7 | 6 | 5 | 4 | 3 | 2 | 1 | 0 |
|---|---|---|---|---|---|---|---|---|
| 0 | Operation code VENDORCMD_NAME | | | | | | | |
| 1 | Reserved 00h | | | | | | | |
| 2 | Reserved 00h | | | | | | | |
| 3, 4 | Allocation Length | | | | | | | |
| 5 | Reserved 00h | | | | | | | | where in byte 0, bits 7, 6 and 5 denote a vendor command i.e. SCSI command group 6, and bits 4, 3, 2, 1 and 0 identify the command. Bytes 3 and 4 denote the amount of data to be transferred from the target to the best.

The vendor command causes the target to a) disconnect from the bus which is a standard SCSI operation, and b) when the data is ready to be transferred to the computer c) reconnect the target to the bus after a frame sync signal. Reconnect is a standard SCSI operation.

The data transfer to the computer takes place at the beginning of alternate frames, in this example. Data transfer could take place at every frame if the computer could process the image data sufficiently quickly.

In regard to b), the processing of the image data to be transferred takes place independently of the SCSI command. The processing, in this example, takes place synchronously with frame sync. The target waits for the data to be ready for transfer.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A video display system comprising a display processor having a display device for displaying images represented by video signals, a source of video synchronisation signals being absent from the display processor, a video signal processor having a source of video synchronisation signals, the processor producing frames of video signals synchronously with the video synchronisation signals, and an interface comprising a first controller in the display processor, a second controller in the video signal processor and a bus linking the controllers, the display processor being arranged to cause the first controller to issue commands to the second controller requesting the supply of frames of video signals to be displayed by the display processor, the video signal processor being arranged to respond to the command by supplying the said frames synchronously with the video synchronisation signals.

2. A system according to claim 1 wherein the display processor is a computer.

3. A system according to claim 2, wherein the display device is an LCD display of the computer.

4. A system according to claim 2, wherein the computer is a lap top computer.

5. A system according to claim 1, wherein the interface is a SCSI interface.

6. A system according to claim 5, wherein the said video signal processor is a SCSI processor device.

7. A system according to claim 6, wherein the said command is a SCSI vendor specific command.

8. A system according to claim 7, wherein the said second controller is arranged to respond to the SCSI command by: a) disconnecting the video signal processor from the bus; b) processing a frame of video signal; and c) reconnecting the video signal processor to the bus and transfer the frame to the display processor synchronously with the video synchronisation signal.

9. A system according to claim 1 wherein the video signal processor comprises a video signal data decompression device for supplying the said frames of video data.

10. A system according to claim 9, wherein the decompression device is a JPEG decoder.

11. A video display system comprising a display processor having an SCSI host adapter acting as an SCSI master, a video signal processor having a source of video synchronisation signals and an SCSI controller acting as an SCSI slave linked by an SCSI bus to the host adapter, wherein the SCSI slave controls the supply of processed video signals to the SCSI master and thereby synchronises the test adaptor to the video synchronisation signals.

* * * * *